2 Sheets—Sheet 1.

H. H. DAY, Dec'd.

S. G. DAY, executrix, assignor to OTIS BROTHERS & COMPANY.

HYDRAULIC AND PNEUMATIC ELEVATOR.

No. 10,031. Reissued Feb. 7, 1882.

Otis Bros. & Co
Assees of
H. H. Day dec'd
By their atty
Charles E. Foster

H. H. DAY, Dec'd.

S. G. DAY, executrix, assignor to OTIS BROTHERS & COMPANY.

HYDRAULIC AND PNEUMATIC ELEVATOR.

No. 10,031. Reissued Feb. 7, 1882.

Attest:
William Paxton
A. Hanemann.

Otis Bros & Co
assees. of
H. H. Day
dec'd
By their atty
Chas. E. Foster

UNITED STATES PATENT OFFICE.

OTIS BROTHERS & COMPANY, OF YONKERS, NEW YORK, ASSIGNEES OF SARAH GOULD DAY, EXECUTRIX OF HORACE H. DAY, DECEASED.

HYDRAULIC AND PNEUMATIC ELEVATOR.

SPECIFICATION forming part of Reissued Letters Patent No. 10,031, dated February 7, 1882.

Original No. 118,696, dated September 5, 1871. Application for reissue filed March 21, 1881.

*To all whom it may concern:*

Be it known that HORACE DAY, now deceased, formerly of Bloomingdale, New Jersey, did invent or discover certain Improvements in Hydraulic and Pneumatic Elevators, for which Letters Patent of the United States were granted to him September 5, 1871, which said invention or discovery, with the Letters Patent intended to secure the same, have by assignment in writing now become the exclusive property of OTIS BROTHERS & COMPANY, a corporation organized under the laws of the State of New York; and the said OTIS BROTHERS & COMPANY do hereby declare the following to be a full, clear, and exact description of the same, reference being had to the accompanying drawings, making part of this specification.

The intention and object of this invention are, by means of a certain combination of air and water chambers, connected with suitable cylinders, guides, and plungers, or pistons and platforms, to use compressed air as a motive power, which air may be compressed either by steam, wind, or water power, and transmitted in pipes long distances, and pressing upon water contained in suitable chambers causes the same to flow into the cylinders containing the plungers or pistons to be raised, whereby the pistons or plungers are lifted or raised as far as they are intended to go, carrying with them suitable platforms, upon which persons and goods may be placed, and thus raised or lowered from one level to another, according as they may desire, the time of operating being under perfect control by means of suitable valves and connections for operating them.

The invention further relates to the combination of elevators with elevated or underground railways, whereby a great saving of labor is effected and facilities afforded for conveying passengers and goods to the level of the street, road, or natural ground, or other desired level.

Figure 1:
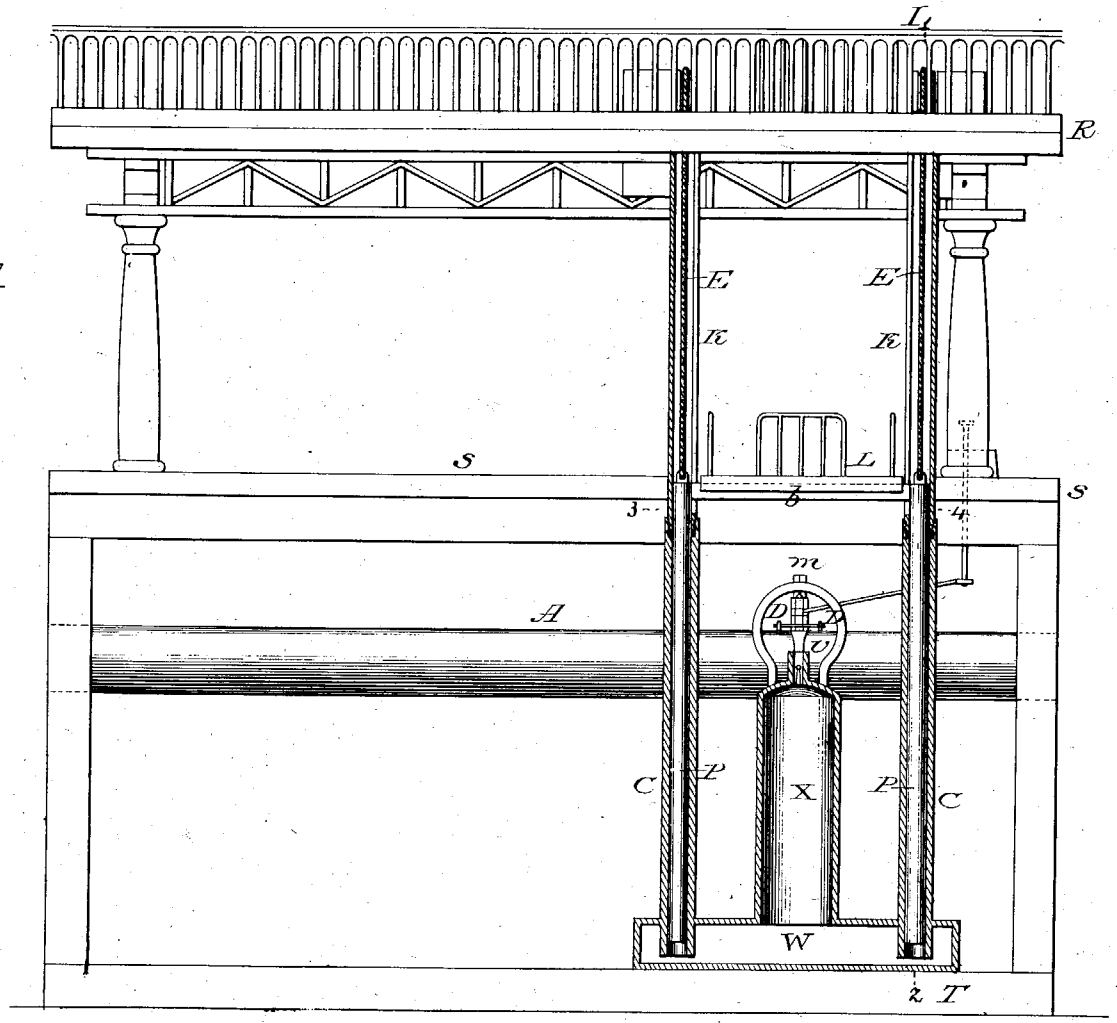
Figure 2:
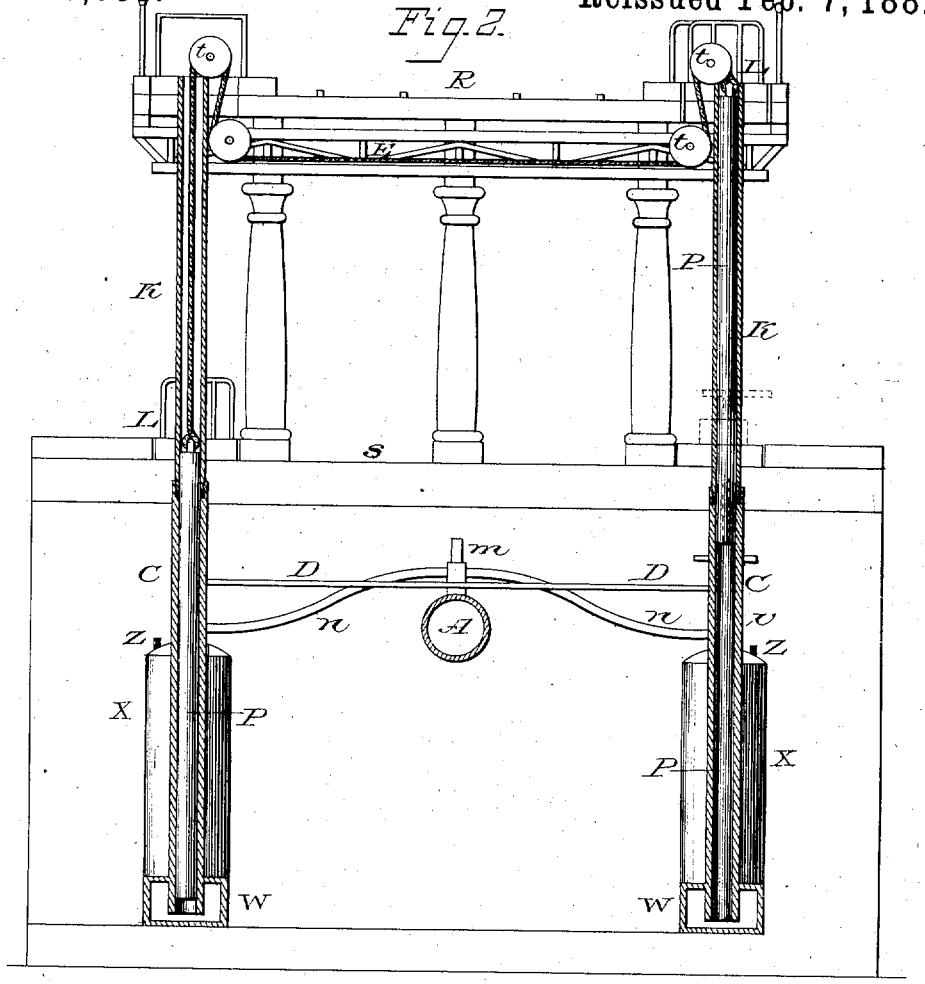
Figure 3:
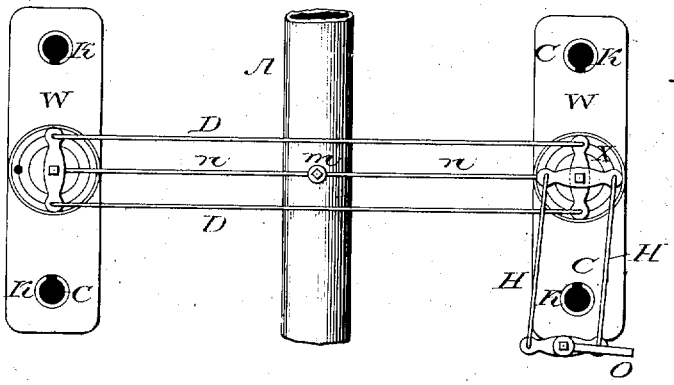
Figure 4:
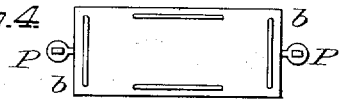
Figure 5:
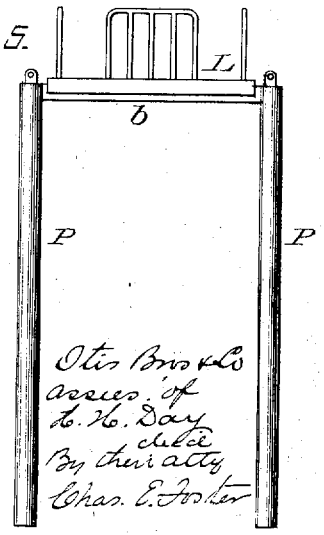

In the drawings forming part of this specification, Figure 1 is a side elevation of apparatus illustrating the invention. Fig. 2 is a transverse sectional elevation on the line 1 2, Fig. 1; Fig. 3, a sectional plan on the line 3 4, Fig. 1; Fig. 4, a plan of the elevator-platform and plungers; Fig. 5, an elevation of the parts shown in Fig. 4.

S S represent the roadway of a street, and R the roadway of an elevated railway supported upon columns.

In the construction shown there are two platforms, L, each connected by a bar, *b*, to the opposite ends of two pistons or plungers, P P, each adapted to a vertical cylinder, C, and slotted tubes K K extend above the cylinders to receive and guide the plungers as they rise and fall, the bars *b* extending through the slots in the sides of the guide-tubes. The cylinders are suitably packed, and the guides may be detachable to permit the packing to be renewed from time to time. Each cylinder communicates with the extended lower compartment, W, of an air and water chamber, X, and with the latter communicates through a pipe, *n*, a pipe, A, constituting a receptacle, into which air is compressed by steam or other power, as aforesaid. The communicating passage or pipe *n* is provided with a stop-valve, *m*, and with a two-way valve, *v*, which may be turned by suitable connections, so as to permit air to flow from the receptacle A into the chamber X, or out of the latter, or so as to close the communication. The chamber X may communicate through a pipe, Z, with a main or cistern to supply any loss of the water, so that the chamber X may be full of water when the platform is in its lowest position. The main pipe passes underground, and is supplied with the compressed air by suitable apparatus, as before described, in such quantities that it will flow, on the opening of the valve *v*, into the chamber X, force the water against the pistons, follow their movements, and raise the elevator from one level to another, as may be desired, the descent being effected by permitting the air to escape, and the platform may be arrested at any point. The movements of the platforms are thus under the perfect control of the operator to cause the platforms to rise or descend, or arrest or reverse the movement at the desired level. The pipe A transmits the air from the compressor to each chamber X, furnishing additional supplies after the air is exhausted on the return movements of the plungers or pistons, and the body of water between the moving body of air and the piston transfers the motion of the air to the piston, and, being highly incompressible, and having comparatively great inertia, insures more regular movements than would result if the piston rested directly upon a body of highly-compressible fluid.

In the drawings, two elevators are shown, one on each side of the street or roadway, each having a tank communicating with the main receptacle A and with the cylinders of the adjacent platform.

D D are rods connecting the valves *v v* of both elevators, and H H are rods connecting with the hand-lever O, by which the operator in charge opens and closes the ports for the admission and escape of compressed fluid to and from the chambers X X, the valves *v v* of which are so arranged that when the compressed fluid is admitted to the chamber *x* of one elevator, situated on one side of the street or road, the fluid is escaping from the other, located on the opposite side of the road, causing one elevator-platform to ascend while the other descends. To economize the working power the pistons and platform of one elevator are connected by means of suitable ropes or chains, E E, passing partly round the pulleys *t t* to the pistons and platform of the other elevator in such mode as to make them balance each other, as shown in Fig. 2, and the whole is so arranged that when the lever O is pulled in one given direction the compressed fluid is admitted to the chamber X of one elevator—say at the right—and forces the water contained therein through the water-compartment W into the cylinders *c c*, causing their pistons *p p* to be forced upward, carrying the platform with its passengers and goods with it. But the same motion of the lever shuts off the port admitting compressed fluid to the chamber X of the elevator at the left, and opens a port to allow the compressed fluid contained therein to escape, and the weight of the platforms and piston, &c., hanging on the rope or chains E E of such elevator, combined with the pressure lifting the other elevator, will cause the elevator at the left to descend, driving the water in the cylinder *c c* back into the chamber X, and so on alternately, as will be readily understood. By the use of a supply of compressed air or equivalent elastic fluid furnished by apparatus actuated by steam, wind, or water power, and transmitted to the working-cylinder, of a body of water or equivalent inelastic fluid which moves with the piston back and forth, and of ports and valve appliances, the operator can have the movements of the platform under perfect control.

This kind of elevators is also applicable to other useful purposes.

We claim—

1. An elevating apparatus in which are combined the following elements, namely: a cylinder and piston, means for affording a supply of compressed elastic fluid in quantities sufficient to propel the pistons, a chamber containing an inelastic fluid communicating with the cylinder and with the elastic-fluid pipe or reservoir, and valve arrangements whereby the elastic fluid may be admitted to, cut off, or exhausted from said chamber, substantially as set forth.

2. In an elevator, the combination, with the cylinder and piston, of a tank containing inelastic fluid, communicating with the cylinder, and with an inlet for compressed elastic fluid, and inlet and outlet ports and valve appliances, whereby the admission and discharge of the elastic fluid and the consequent operating of the platform is effected, substantially as set forth.

3. The combination, with the piston and cylinder of an elevator, of a chamber containing an inelastic fluid, and suitable ports and valve appliances, whereby the admission and discharge of an elastic fluid to and from said chamber is made the means of carrying the inelastic fluid to and from the same, and thereby operating the piston which actuates the platform, substantially as set forth.

4. The combination, with an elevated railway, of the receiver A, containing compressed elastic fluid, the chambers X, containing an inelastic fluid, the valves, cylinders, and pistons, the platforms L, and the connecting devices, substantially as described.

5. A water-supply pipe, Z, combined with the receptacle for the inelastic fluid, arranged between the elastic-fluid supply-pipe and the piston, substantially as set forth.

In testimony whereof I, N. P. OTIS, the treasurer of OTIS BROTHERS & COMPANY, have signed the name of the said OTIS BROTHERS & COMPANY to this specification in the presence of two subscribing witnesses.

OTIS BROS. & CO.
By N. P. OTIS, *Treas.*

Witnesses:
C. V. WILLIAMS,
WM. H. MEADOWCROF.